Patented Oct. 3, 1944

2,359,709

UNITED STATES PATENT OFFICE 2,359,709

ESTERS OF SUBSTITUTED TERTIARY PHENOLIC AMINES

Johannes S. Buck, Albany, and Laszlo Reiner, Mount Vernon, N. Y., assignors to Burroughs Wellcome & Co. (U. S. A.) Inc., New York, N. Y., a corporation of New York No Drawing. Application March 2, 1942, Serial No. 433,030

6 Claims. (Cl. 260—463)

This invention relates to esters of substituted phenolic tertiary amines and salts of these esters and to a method of making the same and has for an object to provide a group of such compounds having novel and improved characteristics.

More specifically the invention provides a new method for producing 3,4 di-ethylcarbonato-phenalkyldialkyl amines and their salts from the highly sensitive 3,4 di-hydroxyphenalkyldialkyl-amines and involves the steps of esterifying a salt of the latter with ethylchlorocarbonate in a cold aqueous alkaline solution protected by an inert atmosphere. The inert atmosphere prevents the oxidation of the dihydroxyphenalkyl-dialkylamine which is unstable when in alkaline solution.

In accordance with the present invention we have obtained a group of phenylalkylamines wherein the nitrogen atom is tertiary and where the ring is twice substituted by an ethylcarbonato radical. Such substituted amines have been found to be pharmacologically active and to produce various physiological effects such as pressor action and mydriatic action. Such properties, combined with relatively low toxicity and the absence of untoward effects make the compounds valuable in medicine.

More specifically the compounds according to this invention may be designated as the 3,4 di-ethylcarbonato-phenalkyldialkyl amines and their salts. These amines may be represented by the following formula:

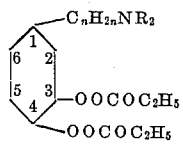

where R is an alkyl group and $C_nH_{2n}$ represents a straight chain or branched chain alkylene radical.

Specific examples of such compounds are as follows:

α - Dimethylamino - β - (3,4 - diethylcarbonato-phenyl) ethane hydrochloride

α - Dimethylamino - β - (3,4 - diethylcarbonato-phenyl) ethane

α - Dimethylamino - β - (3,4 - diethylcarbonato-phenyl) propane

α - Dimethylamino - β - (3,4 - diethylcarbonato-phenyl) propane hydrochloride

β - Dimethylamino - α - (3,4 - diethylcarbonato-phenyl) propane

β - Dimethylamino - α - (3,4 - diethylcarbonato-phenyl) propane hydrochloride

The following specific examples illustrate some of the methods which may be used in the production of the above compounds.

Example 1

3,4-dimethoxyphenethyldimethylamine is demethylated by heating at 150°–155° C. for two hours with concentrated hydrochloric acid. The 3,4-dihydroxyphenethyldimethylamine hydrochloride so obtained is dissolved in water and stirred mechanically, with ice cooling, in an atmosphere of nitrogen. There is then added, alternately, in small portions, dilute sodium hydroxide solution and ethyl chlorocarbonate, until the oil which separates fails to dissolve in dilute sodium hydroxide solution. The oil is then extracted with ether, the extract dried over anhydrous potassium carbonate, and the hydrochloride precipitated by dry hydrogen chloride, and crystallized from acetone-ethyl acetate-ether mixture until pure. So obtained, α-dimethylamino - β - (3,4 - diethylcarbonatophenyl) ethane hydrochloride forms small flat plates, melting at about 136° C.

Example 2

By condensation of 3,4-dimethoxyacetophenone with ethyl bromoacetate, by the Reformatsky method, there is obtained ethyl β-(3,4-dimethoxyphenyl)-β-hydroxybutyrate, which, on dehydration by phosphorus oxychloride gives ethyl 3,4-dimethoxy-β-methylcinnamate. Catalytic reduction of this ester, followed by saponification of the reduced ester, yields β-(3,4-dimethoxyphenyl) butyric acid. The amide of this acid is prepared by heating the ammonium salt in a stream of ammonia at 220°–230° C. From this amide is obtained, by means of a Hofmann reaction with sodium hypochlorite, β-(3,4-dimethoxyphenyl) propylamine. The tertiary amine, β-(3,4-dimethoxyphenyl) propyldimethyl-amine, is made from the foregoing primary amine by methylation with formaldehyde (Eschweiler reaction). Subsequent demethylation by concentrated hydrochloric acid at 170°–180° C. yields β-(3,4-dihydroxyphenyl) propyldimethyl-amine. From this, by the use of sodium hydroxide and ethyl chlorocarbonate, as in the foregoing example, there is obtained α-dimethyl-amino-β-(3,4-diethylcarbonatophenyl) propane.

Example 3

β-Dimethylamino - α - (3,4 - diethylcarbonatophenyl)propane may be made by the following series of reactions. α-Methyl-3,4-dimethoxycinnamic acid is prepared by a Claisen condensation, using atomized sodium, veratric aldehyde and ethyl propionate. After reduction of the acid with sodium amalgam, the α-methyl-3,4-dimethoxyphenylpropionic acid obtained is converted into the corresponding amide by heating the ammonium salt in a stream of ammonia at 220° C. By means of a Hofmann reaction, using sodium hypochlorite and the amide dissolved in dioxane, β-(3,4-dimethoxyphenyl)-isopropylamine is obtained. This amine is converted into the tertiary amine, β-(3,4-dimethoxyphenyl)isopropyldimethylamine, by a modified Eschweiler reaction (heating with 40% formaldehyde and a little formic acid at 125° C.). β-(3,4-dihydroxyphenyl) isopropyldimethylamine is obtained from the foregoing dimethoxyamine by demethylation with concentrated hydrochloric acid at 170°–180° C. and this is finally converted into the required β-dimethylamino-α-(3,4-diethylcarbonatophenyl)propane, by means of sodium hydroxide and ethyl chlorocarbonate, as in Example 1.

The salts of the bases may be made by combining them with an acid, such as hydrochloric acid, sulfuric acid, phosphoric acid, maleic acid, succinic acid and the like by the usual methods.

The foregoing examples are merely illustrative of some of the processes and products involved and it is to be understood that the invention is not to be restricted therto but is only to be limited in accordance with the scope of the following claims.

What is claimed is:

1. A compound selected from the group consisting of α-dimethylamino-β-(3,4-diethylcarbonatophenyl)ethane and its salts.

2. A compound selected from the group consisting of α-dimethylamino-β-(3,4-diethylcarbonatophenyl)propane and its salts.

3. A compound selected from the group consisting of β-dimethylamino-α-(3,4-diethylcarbonatophenyl)propane and its salts.

4. A compound selected from the group consisting of the 3,4 di-ethylcarbonato-phenalkyldialkyl amines and their salts.

5. The method of making a 3,4-di-ethylcarbonato ester of a 3,4 dihydroxyphenalkyldialkylamine which comprises making a water solution of a water soluble salt of the latter amine, alkalizing the solution and esterifying with ethylchlorocarbonate while maintaining an inert atmosphere to prevent oxidation of the dihydroxyphenalkyldialkylamine.

6. In the method as set forth in claim 5 the additional steps of extracting the esterification product, drying the same, and precipitating the hydrochloride salt of said product by reacting the product with hydrogen chloride.

JOHANNES S. BUCK.
LASZLO REINER.